United States Patent
Kim et al.

(10) Patent No.: US 11,309,583 B2
(45) Date of Patent: Apr. 19, 2022

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Ha Eun Kim, Daejeon (KR); Young Min Lim, Daejeon (KR); Gwang Yeon Kim, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 324 days.

(21) Appl. No.: 16/634,959

(22) PCT Filed: Nov. 13, 2018

(86) PCT No.: PCT/KR2018/013783
§ 371 (c)(1),
(2) Date: Jan. 29, 2020

(87) PCT Pub. No.: WO2019/093853
PCT Pub. Date: May 16, 2019

(65) Prior Publication Data
US 2020/0220216 A1   Jul. 9, 2020

(30) Foreign Application Priority Data

Nov. 13, 2017 (KR) .................. 10-2017-0150920
Nov. 12, 2018 (KR) .................. 10-2018-0138408

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0525; H01M 10/0568; H01M 10/0569; H01M 4/505;
(Continued)

(56) References Cited

U.S. PATENT DOCUMENTS

2004/0091786 A1   5/2004   Unoki et al.
2010/0112442 A1   5/2010   Fujikawa et al.
(Continued)

FOREIGN PATENT DOCUMENTS

EP   3648233 A1      5/2020
JP   2002083632 A    3/2002
(Continued)

OTHER PUBLICATIONS

Extended European Search Report including Written Opinion for Application No. EP18875224.0, dated Jun. 30, 2020, pp. 1-5.
(Continued)

*Primary Examiner* — Matthew J Merkling
(74) *Attorney, Agent, or Firm* — Lerner, David, Littenberg, Krumholz & Mentlik, LLP (57) ABSTRACT

A non-aqueous electrolyte solution for a lithium secondary battery and a lithium secondary battery including the same are disclosed herein. In an embodiment, a non-aqueous electrolyte solution for a lithium secondary battery includes a lithium salt, an organic solvent, and an additive, wherein the additive is a mixed additive which includes lithium difluorophosphate, fluorobenzene, tetravinylsilane, and a compound containing one sulfonate group or sulfate group in a weight ratio of 1:2:0.05:0.5 to 1:8:0.3:2.

10 Claims, 3 Drawing Sheets

(51) Int. Cl.
  *H01M 4/525* (2010.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC ... *H01M 10/0525* (2013.01); *H01M 10/0568* (2013.01); *H01M 10/0569* (2013.01); *H01M 2004/027* (2013.01); *H01M 2004/028* (2013.01); *H01M 2300/0051* (2013.01)

(58) Field of Classification Search
  CPC .......... H01M 4/525; H01M 2004/027; H01M 2004/028; H01M 2300/0051
  See application file for complete search history.

(56) References Cited

U.S. PATENT DOCUMENTS

| | | | |
|---|---|---|---|
| 2014/0120414 A1* | 5/2014 | Bhat | H01M 10/0567 429/188 |
| 2014/0272604 A1 | 9/2014 | Lim et al. | |
| 2015/0340736 A1 | 11/2015 | Kim et al. | |
| 2016/0211551 A1 | 7/2016 | Miyasato et al. | |
| 2017/0069935 A1 | 3/2017 | Choi et al. | |
| 2017/0222264 A1 | 8/2017 | Morinaka et al. | |
| 2017/0317384 A1 | 11/2017 | Oomuro et al. | |
| 2019/0089004 A1* | 3/2019 | Kim | H01M 4/525 |
| 2020/0052322 A1* | 2/2020 | Yu | H01M 10/0567 |

FOREIGN PATENT DOCUMENTS

| | | |
|---|---|---|
| JP | 200455502 A | 2/2004 |
| JP | 2009123695 A | 6/2009 |
| JP | 2015522209 A | 8/2015 |
| JP | 2016100100 A | 5/2016 |
| JP | 2017117684 A | 6/2017 |
| KR | 100546919 B1 | 1/2006 |
| KR | 20160032215 A | 3/2016 |
| KR | 20160036810 A | 4/2016 |
| KR | 20170028677 A | 3/2017 |
| KR | 20170033437 A | 3/2017 |
| KR | 20170068595 A | 6/2017 |
| KR | 20170110995 A | 10/2017 |
| WO | 2018003992 A1 | 1/2018 |

OTHER PUBLICATIONS

International Search Report from Application No. PCT/KR2018/013783 dated Feb. 18, 2019, 2 pages.

* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/013783, filed on Nov. 13, 2018, which claims the benefit of priority from Korean Patent Application Nos. 2017-0150920, filed on Nov. 13, 2017, and 2018-0138408, filed on Nov. 12, 2018, the disclosures of which are incorporated by reference herein.

TECHNICAL FIELD

The present invention relates to a non-aqueous electrolyte solution for a lithium secondary battery and a lithium secondary battery including the same.

BACKGROUND ART

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery currently used is composed of a carbon-based negative electrode capable of intercalating and deintercalating lithium ions, a positive electrode formed of a lithium-containing transition metal oxide, and a non-aqueous electrolyte solution in which an appropriate amount of a lithium salt is dissolved in a carbonate-based organic solvent.

Charge and discharge of a lithium secondary battery is possible because lithium ions, which are discharged from the positive electrode by charging, transfer energy while a phenomenon is repeated in which the lithium ions are intercalated into the negative electrode, for example, carbon particles, and deintercalated during discharging.

Also, with respect to the lithium secondary battery, a layer is formed on a surface of the negative electrode while some of electrolyte solution additive components and organic solvents are decomposed in a voltage range of 0.5 V to 3.5 V during initial charge, and lithium ions react with the electrolyte solution on the surface of the negative electrode to form compounds, such as $Li_2CO_3$, $Li_2O$, and LiOH, while the lithium ions generated from the positive electrode move to the negative electrode. These compounds may form a kind of a passivation layer on the surface of the negative electrode, and the layer is denoted as a "solid electrolyte interface (SEI) layer".

The SEI layer formed at an initial stage of charging may prevent a reaction of the lithium ions with the carbon-based negative electrode or other materials during charge and discharge. Also, the SEI layer may only pass the lithium ions by acting as an ion tunnel. The ion tunnel may prevent the destruction of a structure of the carbon-based negative electrode due to the co-intercalation of the carbon-based negative electrode and the organic solvents of the electrolyte solution having a high molecular weight which solvate lithium ions and moves therewith. Therefore, in order to improve high-temperature cycle characteristics and low-temperature output of the lithium secondary battery, a robust SEI layer must be formed on the negative electrode of the lithium secondary battery.

In a case in which the organic solvent used in the non-aqueous electrolyte solution of the lithium secondary battery is generally stored for a long period of time at high temperature, gas is generated while the organic solvent is oxidized by a side reaction with a transition metal oxide discharged from the positive electrode, and battery swelling and electrode assembly deformation occur due to the gas thus generated.

Particularly, since the negative electrode is exposed while the SEI layer is gradually collapsed during high-temperature storage in a fully charged state (e.g., storage at 60° C. after charged to 100% at 4.2 V) and the negative electrode thus exposed reacts with the electrolyte solution to continuously cause the side reaction, gases, such as CO, $CO_2$, $CH_4$, and $C_2H_6$, are generated. As a result, an internal pressure of the battery is increased to cause deformation such as battery swelling. Furthermore, if an internal short circuit of the battery is caused by the battery deformation, fire or explosion of the battery may occur while the battery is deteriorated.

Recently, in order to address this limitation, a method of adding an additive capable of forming an SEI layer in the non-aqueous electrolyte solution has been suggested. However, another limitation may occur in which overall performance of the secondary battery is degraded as other side effects are caused by the electrolyte solution additive.

Thus, there is a continuous need to develop a non-aqueous electrolyte solution with a new configuration which may improve high-temperature and overcharge stability of the lithium secondary battery while minimizing the side effects.

PRIOR ART DOCUMENT

Japanese Patent Application Laid-open Publication No. 2017-117684

DISCLOSURE OF THE INVENTION

Technical Problem

An aspect of the present invention provides a non-aqueous electrolyte solution for a lithium secondary battery which includes an additive capable of forming a stable film on the surface of an electrode.

Another aspect of the present invention provides a lithium secondary battery in which high-temperature and overcharge stability and low-temperature output characteristics are improved by including the non-aqueous electrolyte solution for a lithium secondary battery.

Technical Solution

According to an aspect of the present invention,
there is provided a non-aqueous electrolyte solution for a lithium secondary battery including a lithium salt; an organic solvent; and an additive,
wherein the additive is a mixed additive which includes lithium difluorophosphate (LIPO$_2$F$_2$, LiDFP), fluorobenzene (FB), tetravinylsilane (TVS), and a compound containing one sulfonate group or sulfate group in a weight ratio of 1:2:0.05:0.5 to 1:8:0.3:2.

Specifically, the weight ratio of the lithium difluorophosphate, the fluorobenzene, the tetravinylsilane, and the compound containing one sulfonate group or sulfate group may be in a range of 1:2:0.05:0.5 to 1:6:0.3:1.5.

The compound containing one sulfonate group or sulfate group may include at least one selected from the group consisting of ethylene sulfate, trimethylene sulfate, methyl trimethylene sulfate, 1,3-propane sultone, 1,4-butane sultone, ethene sultone, 1,4-butene sultone, 1-methyl-1,3-propene sultone, and 1,3-propene sultone, and may specifically include at least one selected from the group consisting of ethylene sulfate, trimethylene sulfate, 1,3-propane sultone, and 1,3-propene sultone.

In the non-aqueous electrolyte solution for a lithium secondary battery of the present invention, the additive may be included in an amount of 1 wt % to 18 wt % based on a total weight of the non-aqueous electrolyte solution for a lithium secondary battery.

The non-aqueous electrolyte solution for a lithium secondary battery of the present invention may further include at least one first additive for forming a solid electrolyte interface (SEI) which is selected from the group consisting of a halogen-substituted carbonate-based compound, a nitrile-based compound, a cyclic carbonate-based compound, a phosphate-based compound, a borate-based compound, and a lithium salt-based compound.

Also, the non-aqueous electrolyte solution for a lithium secondary battery of the present invention may further include at least one second additive for forming an SEI which is selected from the group consisting of diphenyl disulfide, di-p-tolyl disulfide, and bis(4-methoxyphenyl) disulfide (BMPDS).

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention.

In this case, the positive electrode includes a lithium-nickel-manganese-cobalt-based oxide as a positive electrode active material, and, specifically, the lithium-nickel-manganese-cobalt-based oxide may include at least one selected from the group consisting of $Li(Ni_{1/3}Mn_{1/3}Co_{1/3})O_2$, $Li(Ni_{0.35}Mn_{0.28}Co_{0.37})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.5})O_2$, and $Li(Ni_{0.8}Mn_{0.1}Co_{0.1})O_2$.

Advantageous Effects

According to the present invention, a non-aqueous electrolyte solution for a lithium secondary battery may be prepared in which a stable solid electrolyte interface (SEI) may be formed on the surface of a negative electrode by including an additive in which four types of compounds are mixed in a specific ratio. Also, a lithium secondary battery may be prepared in which overall performance, such as high-temperature and overcharge stability and low-temperature output characteristics, is improved by including the non-aqueous electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Also, the terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Non-Aqueous Electrolyte Solution for Lithium Secondary Battery

Specifically, in an embodiment of the present invention, provided is a non-aqueous electrolyte solution for a lithium secondary battery including:

a lithium salt; an organic solvent; and an additive, wherein the additive is a mixed additive which includes lithium difluorophosphate (LiDFP), fluorobenzene (FB), tetravinylsilane (tert-vinylsilane, TVS), and a compound containing one sulfonate group or sulfate group in a weight ratio of 1:2:0.05:0.5 to 1:8:0.3:2.

(1) Lithium Salt

In the non-aqueous electrolyte solution for a lithium secondary battery according to the embodiment of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$ and $(CF_3CF_2SO_2)_2N^-$ as an anion.

Specifically, the lithium salt may include a single material selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, LiCH$_3$SO$_3$, lithium fluorosulfonyl imide (LiFSI, LiN(SO$_2$F)$_2$), lithium (bis)trifluoromethanesulfonimide (LiTFSI, LiN(SO$_2$CF$_3$)$_2$), and lithium bisperfluoroethanesulfonimide (LiBETI, LiN(SO$_2$C$_2$F$_5$)$_2$), or a mixture of two or more thereof.

Specifically, the lithium salt may include a single material selected from the group consisting of LiPF$_6$, LiBF$_4$, LiCH$_3$CO$_2$, LiCF$_3$CO$_2$, LiCH$_3$SO$_3$, LiFSI, LiTFSI, and LiN(C$_2$F$_5$SO$_2$) 2, or a mixture of two or more thereof. However, the lithium salt does not include LiDFP which is a lithium salt included in the mixed additive.

The lithium salt may be appropriately changed in a normally usable range, but may specifically be included in a concentration of 0.1 M to 3 M, for example, 0.8 M to 2.5 M in the electrolyte solution. In a case in which the concentration of the lithium salt is greater than 3 M, a lithium ion-transfer effect may be reduced due to an increase in viscosity of the non-aqueous electrolyte solution, and it is difficult to form a uniform solid electrolyte interface (SEI) due to a decrease in wettability of the non-aqueous electrolyte solution.

(2) Organic Solvent

Also, in the non-aqueous electrolyte solution for a lithium secondary battery according to the embodiment of the present invention, a type of the organic solvent is not limited as long as it may minimize decomposition due to an oxidation reaction during charge and discharge of the secondary battery and may exhibit desired characteristics with the additive. For example, a carbonate-based organic solvent, an ether-based solvent, or an ester-based solvent may be used alone or in mixture of two or more thereof.

The carbonate-based organic solvent among the organic solvents may include at least one of a cyclic carbonate-based organic solvent and a linear carbonate-based organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and may specifically include a mixed solvent of ethylene carbonate having high permittivity and propylene carbonate having a relatively lower melting point than the ethylene carbonate.

Also, the linear carbonate-based organic solvent, as a solvent having low viscosity and low permittivity, may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate, and may specifically include dimethyl carbonate.

As the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

The ester-based organic solvent may include at least one selected from the group consisting of a linear ester-based organic solvent and a cyclic ester-based organic solvent.

In this case, specific examples of the linear ester-based organic solvent may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

A highly viscous cyclic carbonate-based organic solvent, which well dissociates the lithium salt in the electrolyte due to high permittivity, may be used as the organic solvent. Also, in order to prepare an electrolyte having higher electrical conductivity, the cyclic carbonate-based organic solvent may be mixed with the low viscosity, low permittivity linear carbonate-based compound, such as dimethyl carbonate and diethyl carbonate, and the linear ester-based compound in an appropriate ratio and used as the organic solvent.

Specifically, the cyclic carbonate-based compound and the linear carbonate-based compound may be mixed and used as the organic solvent, and a weight ratio of the cyclic carbonate-based compound the linear carbonate-based compound in the organic solvent may be in a range of 10:90 to 70:30.

(3) Mixed Additive

The non-aqueous electrolyte solution for a lithium secondary battery of the present invention may include an additive in which lithium difluorophosphate, fluorobenzene, tetravinylsilane, and a compound containing one sulfonate group or sulfate group are mixed together.

In this case, lithium difluorophosphate (LiDFP) represented by the following Formula 1, as one of components of the mixed additive, is a component for achieving an effect of improving long-term life characteristics of the secondary battery, wherein, since it is electrochemically decomposed on surfaces of positive electrode and negative electrode to form a stable SEI, it may prevent exposure to the non-aqueous electrolyte solution. As a result, it may improve durability of the battery by suppressing generation of 02 from the positive electrode and a side reaction between the positive electrode and the electrolyte solution. Also, since a robust and stable SEI may be formed on the surface of the negative electrode while a difluorophosphate structure is reduced during the operation of the battery, the durability of the battery may be improved and high-temperature storage characteristics may be improved.

[Formula 1]

Also, fluorobenzene represented by the following Formula 2, as one of the mixed additive components, is a component for improving stability during overcharge, wherein, since a product decomposed at a specific potential forms a polymer layer on the surfaces of the positive electrode and the negative electrode to prevent the side reaction between the non-aqueous electrolyte solution and the electrode, high-temperature storage stability of the lithium secondary battery may be improved.

[Formula 2]

Furthermore, tetravinylsilane (TVS) represented by the following Formula 3, as one of the mixed additive components, may prevent exposure of the positive electrode and the negative electrode to the non-aqueous electrolyte solution by forming a robust SEI on the surfaces of the positive electrode and the negative electrode through physical adsorption and electrochemical reaction. As a result, since the tetravinylsilane may suppress the side reaction between the non-aqueous electrolyte solution and the electrode at high temperatures and may prevent an increase in resistance, the tetravinylsilane may improve the high-temperature storage stability of the lithium secondary battery.

[Formula 3]

Also, as one of the mixed additive components, the compound containing one sulfonate group or sulfate group may form a stable film, which does not crack even during high-temperature storage, on the surface of the negative electrode. The negative electrode coated with the film may suppress gas generation by suppressing the decomposition of the non-aqueous solvent by a negative electrode active material during high-temperature storage even in a case in which a carbon material highly crystallized with activity of natural graphite or artificial graphite is used in the negative electrode. Thus, high-temperature stability as well as cycle life and capacity characteristics during high-temperature storage of the lithium secondary battery may be improved and a decrease in resistance may be suppressed.

Specifically, the compound containing one sulfonate group or sulfate group may include at least one selected from the group consisting of ethylene sulfate (Esa) represented by the following Formula 4a, trimethylene sulfate (TMS) represented by the following Formula 4b, methyl trimethylene sulfate (MTMS) represented by the following Formula 4c, 1,3-propane sultone (PS) represented by the following Formula 4d, 1,4-butane sultone, ethene sultone, 1,4-butene sultone, 1-methyl-1,3-propene sultone, and 1,3-propene sultone (PRS) represented by the following Formula 4e.

[Formula 4a]

[Formula 4b]

[Formula 4c]

[Formula 4d]

[Formula 4e]

Specifically, the compound containing one sulfonate group or sulfate group may include at least one of ethylene sulfate, trimethylene sulfate, 1,3-propane sultone, and 1,3-propene sultone.

The compound containing one sulfonate group or sulfate group may be included in an amount of up to 6.5 wt % or less, particularly 0.1 wt % to 6.5 wt %, and more particularly 0.5 wt % to 4.0 wt % based on a total weight of the non-aqueous electrolyte solution for a lithium secondary battery.

In a case in which the total amount of the compound containing one sulfonate group or sulfate group in the non-aqueous electrolyte solution for a lithium secondary battery is greater than 6.5 wt %, since an excessively thick film may be formed, resistance may be increased and output may be degraded.

With respect to a compound containing two or more sulfonate groups and/or sulfate groups as a compound represented by the following Formula 5, there is a high possibility that degeneration of the non-aqueous electrolyte solution itself occurs due to high reduction reactivity. Furthermore, since ionic conductivity is increased as a component ratio of S and O in the film formed on the surface of the positive electrode or the negative electrode increases, output characteristics are improved, but, since it is difficult to act as a passive film due to an increase in side reaction with the electrolyte solution, the durability of the secondary battery is relatively reduced at high temperatures, and thus, the use of the compound is avoided.

[Formula 5]

The lithium difluorophosphate, the fluorobenzene, the tetravinylsilane, and the compound containing one sulfonate group or sulfate group may be included in a weight ratio of 1:2:0.05:0.5 to 1:8:0.3:2, for example, 1:2:0.05:0.5 to 1:6:0.3:1.5.

That is, in a case in which each component of the additive in the non-aqueous electrolyte solution of the present invention is mixed in the above ratio, a secondary battery having more improved overall performance may be prepared.

For example, the weight ratio of the fluorobenzene to the lithium difluorophosphate is 8 or less, an increase in internal resistance of the battery due to the excessive use of the additive may be prevented. Also, the weight ratio of the fluorobenzene is 2 or more, a stability improvement effect may be obtained during overcharge.

Also, in a case in which the weight ratio of the tetravinylsilane to the lithium difluorophosphate is 0.3 or less, since the increase in the resistance of the battery due to a side reaction caused by the surplus tetravinylsilane may be prevented, a reduction in cycle life characteristics may be prevented. Furthermore, in a case in which the weight ratio of the tetravinylsilane is 0.05 or more, a gas generation reducing effect and a stabilizing effect during the formation of the SEI may be obtained.

Also, in a case in which the weight ratio of the compound containing one sulfonate group or sulfate group to the lithium difluorophosphate is 2 or less, since the stabilizing effect during the formation of the SEI may be secured, the high-temperature storage characteristics and the cycle life characteristics may be improved. Furthermore, in a case in which the weight ratio of the compound containing one sulfonate group or sulfate group is 0.5 or more, stability of the SEI may be improved without the increase in the resistance, and a performance improvement effect may be achieved by suppressing the electrolyte solution side reaction.

Also, in the non-aqueous electrolyte solution for a lithium secondary battery according to the embodiment of the present invention, the additive may be included in an amount of 1 wt % to 18 wt %, for example, 8 wt % to 10 wt % based on the total weight of the non-aqueous electrolyte solution for a lithium secondary battery.

In a case in which the amount of the additive is 18 wt % or less, the gas generation reducing effect according to the use of the additive may not only be improved, but also the increase in the resistance due to the side reaction may be prevented and a stable SEI may be formed on the surface of the electrode by preventing each component from excessively remaining, and thus, high-temperature stability of the lithium secondary battery may be improved.

Furthermore, in a case in which the amount of the additive is 1 wt % or more, expected effects resulting from the addition of each component may be met, for example, a stable film (SEI) may not only be formed on the surface of the negative electrode, but the decomposition of the electrolyte solution caused by the reaction between the electrolyte solution and the negative electrode may also be suppressed.

If the amount of the additive is greater than 18 wt %, since solubility and wettability are reduced due to an increase in viscosity of the non-aqueous electrolyte solution caused by the excessive amount of the additive, the output characteristics and the cycle life characteristics may be degraded.

Lithium ions from a lithium metal oxide used as a positive electrode are intercalated into a carbon negative electrode while moving to the carbon (crystalline or amorphous) electrode used as the negative electrode during initial charge of a lithium ion battery, wherein, since the lithium ions are highly reactive, the lithium ions react with the carbon-based negative electrode to form an organic material, $Li_2CO_3$, LiO, or LiOH, and these materials form an SEI on the surface of the negative electrode. Once the SEI is formed during initial charge, the SEI may act as an ion tunnel that only passes the lithium ions between the electrolyte solution and the negative electrode while preventing a reaction of the lithium ions with the carbon-based negative electrode or other materials during repeated charge and discharge caused by the subsequent use of the battery. Since the SEI blocks the movement of an organic solvent for an electrolyte solution having a high molecular weight, for example, EC, DMC, DEC, or PP, to the carbon-based negative electrode by the ion tunnel effect, it is possible to inhibit the insertion (co-intercalation) of the organic solvent into the carbon-based negative electrode together with the lithium ion, thereby preventing the collapse of the structure of the carbon-based negative electrode. That is, once the SEI is formed, since the side reaction of the lithium ions with the carbon-based negative electrode or other materials does not occur again, an amount of the lithium ions may be reversibly maintained during the charge and discharge caused by the subsequent use of the battery.

In other words, since the carbon material of the negative electrode reacts with the electrolyte solution during initial charge to form a passivation layer, it allows stable charge and discharge to be maintained without further decomposition of the electrolyte solution, and, in this case, the quantity of electric charge consumed for the formation of the passivation layer on the surface of the negative electrode is irreversible capacity, wherein it has features that do not react reversibly during discharge, and, for this reason, the lithium ion battery no longer exhibits an irreversible reaction after the initial charge reaction and may maintain a stable life cycle.

However, in a case in which the lithium ion battery is stored at high temperature in a fully charged state (e.g., storage at 60° C. after charged to 100% at 4.2 V or more), it is disadvantageous in that the SEI is gradually collapsed by electrochemical energy and thermal energy which are increased over time.

The collapse of the SEI allows the surface of the negative electrode to be exposed, the exposed surface of the negative electrode is decomposed as it reacts with the carbonate-based solvent in the electrolyte solution, and thus, a continuous side reaction occurs.

The side reaction may continuously generate gas, and major gases generated in this case may be CO, $CO_2$, $CH_4$, and $C_2H_6$, wherein the gases generated may vary depending on the type of the carbonate used as the electrolyte solution and the type of the negative electrode active material and, regardless of the type, the continuous gas generation at a high temperature increases the internal pressure of the lithium ion battery so that it becomes a cause of swelling of a battery thickness.

Thus, since the non-aqueous electrolyte solution for a lithium secondary battery of the present invention includes the mixed additive in which the lithium difluorophosphate, the fluorobenzene, the tetravinylsilane, and the compound containing one sulfonate group or sulfate group are mixed in a specific ratio, a more stable and robust SEI is formed on the surfaces of the positive electrode and the negative electrode to have a low-temperature output characteristics improvement effect and suppress the electrolyte solution side reaction during high-temperature storage, and thus, overall performance, such as high-temperature storage characteristics and life characteristics, of the lithium secondary battery may be improved.

(4) Additive for Forming SEI

The non-aqueous electrolyte solution according to the embodiment of the present invention may further include an additional additive which may be used with the mixed additive to form a stable film on the surfaces of the negative electrode and the positive electrode while not significantly increasing initial resistance in addition to the effect from the mixed additive, or which may act as a complementary agent for suppressing the decomposition of the solvent in the non-aqueous electrolyte solution and improving the mobility of lithium ions.

The additional additive is not particularly limited as long as it is an additive for forming an SEI that may form a stable film on the surfaces of the positive electrode and the negative electrode.

Specifically, as a representative example, the additive for forming an SEI may include at least one first additive for forming an SEI which is selected from the group consisting of a halogen-substituted carbonate-based compound, a nitrile-based compound, a cyclic carbonate-based compound, a phosphate-based compound, a borate-based compound, and a lithium salt-based compound.

Specifically, the halogen-substituted carbonate-based compound may include fluoroethylene carbonate (FEC) and may be included in an amount of 5 wt % or less based on the total weight of the non-aqueous electrolyte solution. In a case in which the amount of the halogen-substituted carbonate-based compound is greater than 5 wt %, cell swelling performance may deteriorate.

Also, the nitrile-based compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In a case in which the nitrile-based compound is used with the above-described mixed additive, an effect, such as an improvement of high-temperature characteristics, may be expected due to the stabilization of the film formed on the positive electrode/negative electrode. That is, the nitrile-based compound may act as a complementary agent for forming the negative electrode SEI, may play a role in suppressing the decomposition of the solvent in the electrolyte, and may play a role in improving the mobility of the lithium ions. The nitrile-based compound may be included in an amount of 8 wt % or less based on the total weight of the non-aqueous electrolyte solution. In a case in which the total amount of the nitrile-based compound in the non-aqueous electrolyte solution is greater than 8 wt %, since the resistance is increased due to an increase in the film formed on the surface of the electrode, battery performance may deteriorate.

The carbonate-based compound may improve the durability of the battery by forming a stable SEI mainly on the surface of the negative electrode during battery activation. The cyclic carbonate-based compound may include vinylene carbonate (VC) or vinyl ethylene carbonate, and may be included in an amount of 3 wt % or less based on the total weight of the non-aqueous electrolyte solution. In a case in which the amount of the cyclic carbonate-based compound in the non-aqueous electrolyte solution is greater than 3 wt %, cell swelling inhibition performance and initial resistance may deteriorate.

Furthermore, since the phosphate-based compound stabilizes $PF_6$ anions in the electrolyte solution and assists in the formation of the films on the positive electrode and negative electrode, the phosphate-based compound may improve the durability of the battery. The phosphate-based compound may include at least one compound selected from the group consisting of lithium difluoro bis(oxalato)phosphate (LiDFOP), lithium tetrafluoro(oxalato)phosphate (LiTFOP), trimethylsilyl phosphite (TMSPi), tris(2,2,2-trifluoroethyl) phosphate (TFEPa), and tris(trifluoroethyl)phosphite (TFEPi), and the phosphate-based compound may be included in an amount of 3 wt % or less based on the total weight of the non-aqueous electrolyte solution.

Since the borate-based compound promotes ion-pair separation of a lithium salt, the borate-based compound may improve the mobility of lithium ions, may reduce the interfacial resistance of the SEI, and may dissociate a material, such as LiF, which may be formed during a battery reaction but is not well separated, and thus, a problem, such as generation of hydrofluoric acid gas, may be solved. The borate-based compound may include lithium bis(oxalato) borate (LiBOB, $LiB(C_2O_4)_2$), lithium oxalyldifluoroborate, or tris(trimethylsilyl)borate (TMSB), and the borate-based compound may be included in an amount of 3 wt % or less based on the total weight of the non-aqueous electrolyte solution.

Also, the lithium salt-based compound is a compound different from the lithium salt included in the non-aqueous electrolyte solution, wherein the lithium salt-based compound may include at least one compound selected from the group consisting of LiODFB and $LiBF_4$ and may be included in an amount of 3 wt % or less based on the total weight of the non-aqueous electrolyte solution.

Two or more of the first additives for forming an SEI may be mixed and used, and the first additive for forming an SEI may be included in an amount of 10 wt % or less, and particularly 0.01 wt % to 10 wt %, for example, 0.1 wt % to 5.0 wt % based on the total weight of the electrolyte solution.

In a case in which the amount of the first additive for forming an SEI is less than 0.01 wt %, the high-temperature storage characteristics and the gas generation reducing effect to be achieved from the additive may be insignificant, and, in a case in which the amount of the first additive for forming an SEI is greater than 10 wt %, the side reaction in the electrolyte solution during charge and discharge of the battery may excessively occur. Particularly, if the excessive amount of the first additive for forming an SEI is added, the first additive for forming an SEI may not be sufficiently decomposed so that it may be present in the form of an unreacted material or precipitates in the electrolyte solution at room temperature. Accordingly, resistance may be increased to degrade life characteristics of the secondary battery.

The non-aqueous electrolyte solution according to the embodiment of the present invention may further include at least one second additive for forming an SEI which is selected from the group consisting of diphenyl disulfide (DPDS), di-p-tolyl disulfide (DTDS), and bis(4-methoxyphenyl) disulfide (BMPDS), in order to form a more stable protective layer on the surface of the negative electrode.

The second additive for forming an SEI contributes to the formation of the stable protective layer on the surface of the negative electrode carbon material. A stable state of the protective layer is maintained even if charge and discharge are repeated. That the non-aqueous solvent in the electrolyte solution is electrochemically reduced to generate gas is suppressed by the action of the protective layer. As a result, exfoliation of the negative electrode carbon material from the negative electrode may be suppressed and cycle characteristics may be improved.

Also, with respect to DPDS, DTDS, and BMPDS, a reaction product of the non-aqueous solvent with the carbon-based negative electrode during the formation of the protective layer acts on polar group ends present in PVDF and P(VDF-HFP), as binders, to suppress swelling of the binder and maintain adhesion between electrode materials. As a result, effects of suppressing an increase in impedance of the electrode and simultaneously further improving the cycle characteristics may be obtained.

The second additives for forming an SEI may each be included in an amount of 0.6 wt % or less, for example, 0.1 wt % to 0.6 wt % based on the total weight of the non-aqueous electrolyte solution for a lithium secondary battery. If the amount of the additive is 0.1 wt % or more, the effects to be achieved from the additive may be obtained, and, if the amount of the additive is 0.6 wt % or less, a side reaction due to the surplus additive may be prevented.

Lithium Secondary Battery

Also, in an embodiment of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution of the present invention.

In this case, the positive electrode may include a lithium-nickel-manganese-cobalt-based oxide as a positive electrode active material.

In the lithium secondary battery of the present invention, an electrode assembly may be prepared by sequentially stacking the positive electrode, the negative electrode, and the separator disposed between the positive electrode and the negative electrode, and, in this case, those prepared by a typical method and used in the preparation of the lithium secondary battery may all be used as the positive electrode, the negative electrode, and the separator which constitute the electrode assembly.

(1) Positive Electrode

The positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, in terms of the improvement of capacity characteristics and stability of the battery, the lithium composite metal oxide may include a lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}CO_{q1}Mn_{r2})O_4$ (where $0<p1<2$, $0<q1<2$, $0<r2<2$, and $p1+q1+r2=2$), etc.).

Typical examples of the positive electrode active material may be $Li(Ni_{1/3}Mn_{1/3}Co_{1/3})O_2$, $Li(Ni_{0.35}Mn_{0.28}Co_{0.37})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.5})O_2$, and $Li(Ni_{0.8}Mn_{0.1}Co_{0.1})O_2$.

In addition to the lithium-nickel-manganese-cobalt-based oxide, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}CO_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), or lithium-nickel-cobalt-transition metal (M) oxide (e.g., Li $(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

The positive electrode active material may include $LiCoO_2$, $LiMnO_2$, $LiNiO_2$, or lithium nickel cobalt aluminum oxide (e.g., $Li(Ni_{0.8}Co_{0.15}Al_{0.05})O_2$, etc.).

The positive electrode active material may be included in an amount of 90 wt % to 99 wt %, for example, 93 wt % to 98 wt %, based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

The negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $LixFe_2O_3$ ($0 \leq x \leq 1$), $Li_xWO_2$ ($0 \leq x \leq 1$), and $SnxMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution of the present invention was prepared by adding 3.6 g of a mixed additive, in which lithium difluorophosphate (LiDFP), fluorobenzene (FB), tetravinylsilane (TVS), and 1,3-propane sultone (PS) were mixed as additives in a weight ratio of 1:2:0.1:0.5, to 96.4 g of an organic solvent (ethylene carbonate:ethyl methyl carbonate=volume ratio of 30:70) in which 1.0 M LiPF$_6$ was dissolved (see Table 1 below).

(Electrode Preparation)

A positive electrode active material (Li(Ni$_{0.6}$Mn$_{0.2}$Co$_{0.2}$)O$_2$), a conductive agent (carbon black), and a binder (polyvinylidene fluoride) were added to N-methyl-2-pyrrolidone (NMP), as a solvent, at a weight ratio of 90:5:5 to prepare a positive electrode active material slurry (solid content of 50 wt %). A 100 μm thick positive electrode collector (Al thin film) was coated with the positive electrode active material slurry, dried, and roll-pressed to prepare a positive electrode.

A negative electrode active material (artificial graphite), a binder (PVDF), and a conductive agent (carbon black) were added to NMP, as a solvent, at a weight ratio of 95:2:3 to prepare a negative electrode active material slurry (solid content of 60 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by sequentially stacking a polyethylene porous film with the positive electrode and negative electrode prepared by the above-described methods, the electrode assembly was put in a battery case, the non-aqueous electrolyte solution was injected thereinto, and the battery case was sealed to prepare a lithium secondary battery.

Example 2

A non-aqueous electrolyte solution of the present invention and a secondary battery including the same were prepared in the same manner as in Example 1 except that 2.16 g of a mixed additive, in which LiDFP, FB, TVS, and PS were mixed as additives in a weight ratio of 1:2:0.1:0.5, was added to 97.84 g of an organic solvent during the preparation of the non-aqueous electrolyte solution (see Table 1 below).

Example 3

A non-aqueous electrolyte solution of the present invention and a secondary battery including the same were prepared in the same manner as in Example 1 except that 5.4 g of a mixed additive, in which LiDFP, FB, TVS, and PS were mixed as additives in a weight ratio of 1:2:0.1:1.5, was added to 94.6 g of a solvent during the preparation of the non-aqueous electrolyte solution (see Table 1 below).

Example 4

A non-aqueous electrolyte solution of the present invention and a secondary battery including the same were prepared in the same manner as in Example 1 except that 11.3 g of a mixed additive, in which LiDFP, FB, TVS, and PS were mixed as additives in a weight ratio of 1:8:0.3:2, was added to 88.7 g of a solvent during the preparation of the non-aqueous electrolyte solution (see Table 1 below).

Example 5

A non-aqueous electrolyte solution of the present invention and a secondary battery including the same were prepared in the same manner as in Example 1 except that 4 g of a mixed additive, in which LiDFP, FB, TVS, and PS were mixed as additives in a weight ratio of 1:8:0.3:2, was added to 96 g of a solvent during the preparation of the non-aqueous electrolyte solution (see Table 1 below).

Example 6

A non-aqueous electrolyte solution of the present invention and a secondary battery including the same were prepared in the same manner as in Example 1 except that 16.95 g of a mixed additive, in which LiDFP, FB, TVS, and PS were mixed as additives in a weight ratio of 1:8:0.3:2, was added to 83.05 g of a solvent during the preparation of the non-aqueous electrolyte solution (see Table 1 below).

Example 7

A non-aqueous electrolyte solution of the present invention and a secondary battery including the same were prepared in the same manner as in Example 1 except that 8.7 g of a mixed additive, in which LiDFP, FB, TVS, and PS were mixed as additives in a weight ratio of 1:6:0.2:1.5, was added to 91.3 g of a solvent during the preparation of the non-aqueous electrolyte solution (see Table 1 below).

Example 8

A non-aqueous electrolyte solution of the present invention and a secondary battery including the same were prepared in the same manner as in Example 1 except that 14 g of a mixed additive, in which LiDFP, FB, TVS, and PS were mixed as additives in a weight ratio of 1:8:0.05:0.5, was added to 86 g of a solvent during the preparation of the non-aqueous electrolyte solution (see Table 1 below).

Example 9

A non-aqueous electrolyte solution of the present invention and a secondary battery including the same were prepared in the same manner as in Example 1 except that 4 g of a mixed additive, in which LiDFP, FB, TVS, and PRS were mixed as additives in a weight ratio of 1:8:0.3:2, was added to 96 g of a solvent during the preparation of the non-aqueous electrolyte solution (see Table 1 below).

Example 10

A non-aqueous electrolyte solution of the present invention and a secondary battery including the same were prepared in the same manner as in Example 1 except that 4 g of a mixed additive, in which LiDFP, FB, TVS, and TMS were mixed as additives in a weight ratio of 1:8:0.3:2, was added to 96 g of a solvent during the preparation of the non-aqueous electrolyte solution (see Table 1 below).

Example 11

A non-aqueous electrolyte solution of the present invention and a secondary battery including the same were prepared in the same manner as in Example 1 except that 16.95 g of a mixed additive, in which LiDFP, FB, TVS, PS, and TMS were mixed as additives in a weight ratio of 1:8:0.3:1:1, was added to 83.05 g of a solvent during the preparation of the non-aqueous electrolyte solution (see Table 1 below).

Example 12

A non-aqueous electrolyte solution of the present invention and a secondary battery including the same were prepared in the same manner as in Example 1 except that 8.7 g of a mixed additive, in which LiDFP, FB, TVS, PS, and Esa were mixed as additives in a weight ratio of 1:6:0.2:0.5:1.0, was added to 91.3 g of a solvent during the preparation of the non-aqueous electrolyte solution (see Table 1 below).

Example 13

A non-aqueous electrolyte solution of the present invention and a secondary battery including the same were prepared in the same manner as in Example 1 except that 10.05 g of a mixed additive, in which LiDFP, FB, TVS, and Esa were mixed as additives in a weight ratio of 1:4:0.2:1.5, was added to 89.95 g of a solvent during the preparation of the non-aqueous electrolyte solution (see Table 1 below).

Example 14

A non-aqueous electrolyte solution of the present invention and a secondary battery including the same were prepared in the same manner as in Example 1 except that 18 g of a mixed additive, in which LiDFP, FB, TVS, PS, and Esa were mixed as additives in a weight ratio of 1:8:0.3:1:1, was added to 82 g of an organic solvent during the preparation of the non-aqueous electrolyte solution (see Table 1 below).

Example 15

A non-aqueous electrolyte solution of the present invention and a secondary battery including the same were prepared in the same manner as in Example 1 except that 22 g of a mixed additive, in which LiDFP, FB, TVS, PS, and Esa were mixed as additives in a weight ratio of 1:4:0.2:0.5:1, was added to 78 g of an organic solvent during the preparation of the non-aqueous electrolyte solution (see Table 1 below).

Comparative Example 1

A non-aqueous electrolyte solution and a secondary battery including the same were prepared in the same manner as in Example 1 except that 3 g of vinylene carbonate was only added as an additive to 97 g of a solvent during the preparation of the non-aqueous electrolyte solution (see Table 2 below).

Comparative Example 2

A non-aqueous electrolyte solution and a secondary battery including the same were prepared in the same manner as in Example 1 except that 2 g of $LiBF_4$ was only added as an additive to 98 g of a solvent during the preparation of the non-aqueous electrolyte solution (see Table 2 below).

Comparative Example 3

A non-aqueous electrolyte solution and a secondary battery including the same were prepared in the same manner as in Example 1 except that 12.7 g of a mixed additive, in which LiDFP, FB, TVS, and PS were mixed as additives in a weight ratio of 1:15:0.2:1.5, was added to 87.3 g of a solvent during the preparation of the non-aqueous electrolyte solution (see Table 2 below).

Comparative Example 4

A non-aqueous electrolyte solution and a secondary battery including the same were prepared in the same manner as in Example 1 except that 9 g of a mixed additive, in which LiDFP, FB, TVS, and PS were mixed as additives in a weight ratio of 1:6:0.5:1.5, was added to 91 g of a solvent during the preparation of the non-aqueous electrolyte solution (see Table 2 below).

Comparative Example 5

A non-aqueous electrolyte solution and a secondary battery including the same were prepared in the same manner as in Example 1 except that 10.2 g of a mixed additive, in which LiDFP, FB, TVS, and PS were mixed as additives in a weight ratio of 1:6:0.2:5, was added to 89.8 g of a solvent during the preparation of the non-aqueous electrolyte solution (see Table 2 below).

Comparative Example 6

A non-aqueous electrolyte solution and a secondary battery including the same were prepared in the same manner as in Example 1 except that 8.2 g of a mixed additive, in which FB, TVS, and PS were mixed as additives in a weight ratio of 6:0.2:2, was added to 91.8 g of a solvent during the preparation of the non-aqueous electrolyte solution (see Table 2 below).

Comparative Example 7

A non-aqueous electrolyte solution and a secondary battery including the same were prepared in the same manner as in Example 1 except that 5.2 g of a mixed additive, in which LiDFP, TVS, and PS were mixed as additives in a weight ratio of 2:0.2:3, was added to 94.8 g of a solvent during the preparation of the non-aqueous electrolyte solution (see Table 2 below).

Comparative Example 8

A non-aqueous electrolyte solution and a secondary battery including the same were prepared in the same manner as in Example 1 except that 8.5 g of a mixed additive, in which LiDFP, FB, and PS were mixed as additives in a weight ratio of 1:6:1.5, was added to 91.5 g of a solvent during the preparation of the non-aqueous electrolyte solution (see Table 2 below).

Comparative Example 9

A non-aqueous electrolyte solution and a secondary battery including the same were prepared in the same manner as in Example 1 except that 7.2 g of a mixed additive, in which LiDFP, FB, and TVS were mixed as additives in a weight ratio of 1:6:0.2, was added to 92.8 g of a solvent during the preparation of the non-aqueous electrolyte solution (see Table 2 below).

Comparative Example 10

A non-aqueous electrolyte solution and a secondary battery including the same were prepared in the same manner as in Example 1 except that 9.2 g of a mixed additive, in which LiDFP, FB, TVS, and MMDS (methylene methanedisulfonate) were mixed as additives in a weight ratio of 1:6:0.2:2, was added to 90.8 g of a solvent during the preparation of the non-aqueous electrolyte solution (see Table 2 below).

Comparative Example 11

A non-aqueous electrolyte solution and a secondary battery including the same were prepared in the same manner as in Example 1 except that 2.15 g of a mixed additive, in which LiDFP, FB, TVS, and TMS were mixed as additives in a weight ratio of 0.9:8:0.3:2, was added to 97.85 g of a solvent during the preparation of the non-aqueous electrolyte solution (see Table 2 below).

Comparative Example 12

A non-aqueous electrolyte solution and a secondary battery including the same were prepared in the same manner as in Example 1 except that 9.04 g of a mixed additive, in which LiDFP, FB, TVS, and Esa were mixed as additives in a weight ratio of 1:6:0.04:2, was added to 90.96 g of a solvent during the preparation of the non-aqueous electrolyte solution (see Table 2 below).

Comparative Example 13

A non-aqueous electrolyte solution and a secondary battery including the same were prepared in the same manner as in Example 1 except that 3.5 g of a mixed additive, in which LiDFP, FB, TVS, and PS were mixed as additives in a weight ratio of 1:6:0.2:0.4, was added to 96.5 g of a solvent during the preparation of the non-aqueous electrolyte solution (see Table 2 below).

EXPERIMENTAL EXAMPLES

Experimental Example 1: Low-Temperature Output Characteristics Evaluation

Each of the lithium secondary batteries prepared in Examples 1 and 4 and Comparative Examples 1 and 4 was charged at 0.33 C/4.25 V to 4.25 V/0.05 C under a constant current/constant voltage (CC/CV) condition at 25° C. within a driving voltage range of 3.0 V to 4.25 V and discharged at a constant current of 0.33 C to a SOC of 50% to set a charge status of the battery.

After each secondary battery was left standing at −30° C. for 4 hours or more for temperature equilibrium, a voltage drop, which was obtained in a state in which each secondary battery was subjected to a discharge pulse with a power of 3 W to 7 W for 30 seconds, was measured. The above-described SOC setting and low-temperature output characteristics evaluation were performed by using PNE-0506 charge/discharge equipment (manufacturer: PNE SOLUTION Co., Ltd., 5 V, 6 A).

Figure 1:
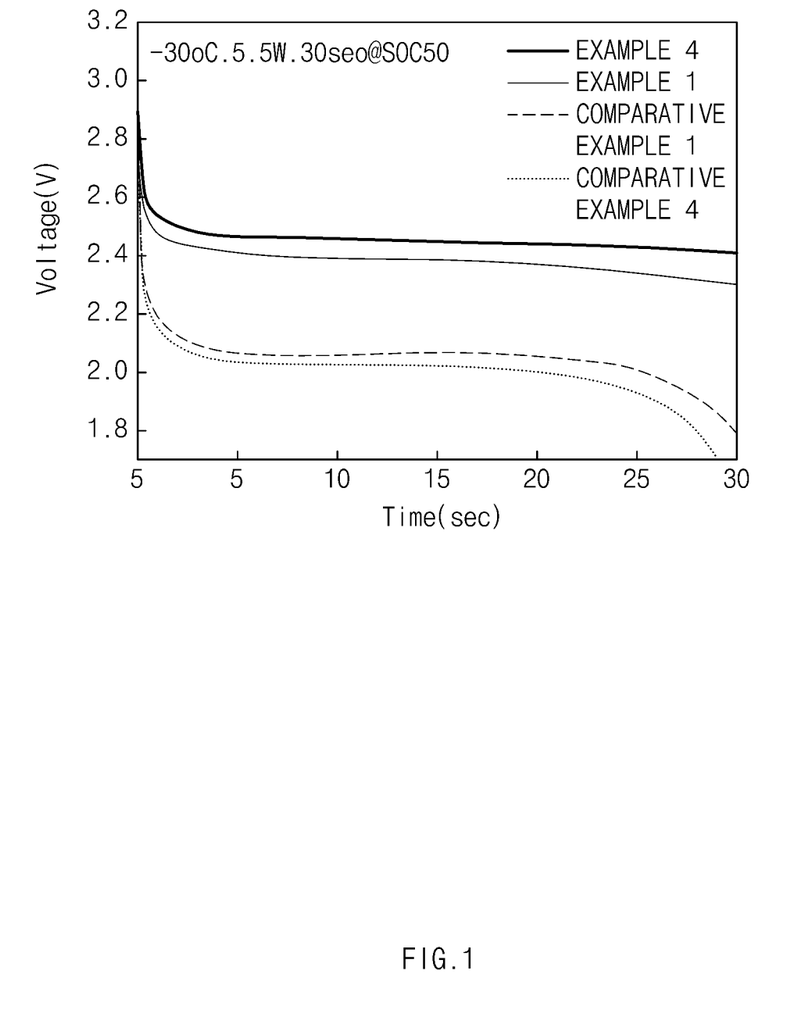
FIG. 1 is a graph illustrating the results of low-temperature output characteristics evaluation of lithium secondary batteries according to Experimental Example 1 of the present invention.

Low-temperature output characteristics of each secondary battery were calculated using the obtained voltage drop, and the results thereof are presented in FIG. 1.

Referring to FIG. 1, with respect to the lithium secondary batteries including the non-aqueous electrolyte solutions according to Examples 1 and 4 of the present invention, it may be understood that degrees of voltage drop were lower than those of the lithium secondary batteries of Comparative Examples 1 and 4. Thus, from these results, it may be confirmed that low-temperature output characteristics were excellent.

Experimental Example 2: Capacity Retention Evaluation after High-Temperature Storage Each of the lithium secondary batteries prepared in Examples 1 to 15 and Comparative Examples 1 to 13 was charged at 0.33 C/4.25 V to 4.25 V/0.05 C under a constant current/constant voltage (CC/CV) condition at 25° C. and discharged at a constant current of 0.33 C/3.0 V. In this case, discharge capacity measured using the PNE-0506 charge/discharge equipment (manufacturer: PNE SOLUTION Co., Ltd., 5 V, 6 A) after cell assembly/before high-temperature storage was defined as initial discharge capacity.

Each of the lithium secondary batteries was set to a SOC of 100% and then stored at 60° C. for 16 weeks.

Next, each lithium secondary battery was charged at 0.33 C/4.25 V to 4.25 V/0.05 C under a constant current/constant voltage (CC/CV) condition at 25° C. and discharged at a constant current of 0.33 C/3.0 V, and discharge capacity was measured using the PNE-0506 charge/discharge equipment (manufacturer: PNE SOLUTION Co., Ltd., 5 V, 6 A). In this case, the measured discharge capacity was defined as discharge capacity after high-temperature storage.

Capacity retention was measured by substituting the measured discharge capacity into the following Equation (1), and the results thereof are listed in Tables 1 and 2 below.

$$\text{capacity retention (\%)}=(\text{discharge capacity after high-temperature storage/initial discharge capacity})\times 100 \qquad \text{Equation (1):}$$

Experimental Example 3: Output Characteristics Evaluation after High-Temperature Storage Each of the lithium secondary batteries prepared in Examples 1 to 15 and Comparative Examples 1 to 13 was discharged to a SOC of 50% at a constant current of 0.33 C and 25° C. to set a charge status of the battery.

Next, output of each of the lithium secondary batteries was measured by a voltage drop obtained in a state in which each lithium secondary battery was subjected to a discharge pulse at 2.5 C for 30 seconds under a constant current (CC) condition to 2.5 V. In this case, a discharge output value measured using the PNE-0506 charge/discharge equipment (manufacturer: PNE SOLUTION Co., Ltd., 5 V, 6 A) after cell assembly/before high-temperature storage was defined as initial discharge output.

Each of the lithium secondary batteries was set to a SOC of 100% and then stored at 60° C. for 16 weeks.

Next, each lithium secondary battery was charged at 0.33 C/4.25 V to 4.25 V/0.05 C under a constant current/constant voltage (CC/CV) condition at 25° C. and discharged at a constant current of 0.33 C/3.0 V, and a discharge output value was measured using the PNE-0506 charge/discharge equipment (manufacturer: PNE SOLUTION Co., Ltd., 5 V, 6 A). In this case, the measured discharge output value was defined as a discharge output value after high-temperature storage.

Output retention (%) was calculated by substituting the measured output into the following Equation (2), and the results thereof are listed in Tables 1 and 2 below.

output characteristics (%)=(discharge output (W) after high-temperature storage/initial discharge output (W))×100    Equation (2):

Experimental Example 4. Evaluation of Battery Thickness Increase Rate after High-Temperature Storage Each of the lithium secondary batteries prepared in Examples 1 to 15 and Comparative Examples 1 to 13 was fully charged at 0.33 C/4.25 V to 4.25 V/0.05 C under a constant current/constant voltage (CC/CV) condition at 25° C. within a driving voltage range of 3.0 V to 4.25 V and a thickness of each secondary battery was measured with a plate thickness gauge (Mitutotyo (Japan)) at a SOC of 100%. A thickness first measured after cell assembly was defined as an initial thickness.

Subsequently, after each of the lithium secondary batteries subjected to the initial charge and discharge was charged at 4.25 V to a SOC of 100% and stored at 60° C. for 16 weeks, each lithium secondary battery was cooled at room temperature and a thickness after high-temperature storage was then measured using the plate thickness gauge (Mitutotyo (Japan)).

A thickness increase rate was calculated by substituting the initial thickness and thickness after high-temperature storage measured as described above into the following Equation (3), and the results thereof are listed in Tables 1 and 2 below.

thickness increase rate (%)={(thickness after high-temperature storage−initial thickness)/initial thickness}×100    Equation (3):

Experimental Example 5. Evaluation of Cycle Life Characteristics after High-Temperature Storage Each of the lithium secondary batteries prepared in Examples 1 to 15 and Comparative Examples 1 to 13 was charged at 0.33 C/4.25 V to 4.25 V/0.05 C under a constant current/constant voltage (CC/CV) condition at 25° C. and discharged at a constant current of 0.33 C/3.0 V. The above charging and discharging were set as one cycle, and 500 cycles of charging and discharging were repeatedly performed.

In this case, capacity after a first cycle and capacity after a $500^{th}$ cycle were measured using the PNE-0506 charge/discharge equipment (manufacturer: PNE SOLUTION Co., Ltd., 5 V, 6 A), and cycle life characteristics were evaluated by substituting the capacities into the following Equation (4). The results thereof are listed in Tables 1 and 2 below.

cycle life characteristics (%)=($500^{th}$ cycle capacity/ $1^{st}$ cycle capacity)×100    Equation (4):

TABLE 1

| | Additive (weight ratio) | | | | | | Total amount of additive in non-aqueous solution (g) | After high-temperature storage | | | | Remarks |
|---|---|---|---|---|---|---|---|---|---|---|---|---|
| | | | | Compound containing sulfonate group or sulfate group | | | | Capacity retention (%) | Output characteristics (%) | Thickness increase rate (%) | Cycle life characteristics (%) | |
| | LiDFP | FB | TVS | Type | Weight ratio | Others | | | | | | |
| Example 1 | 1 | 2 | 0.1 | PS | 0.5 | — | 3.6 | 91.5 | 103 | 23.3 | 91.2 | |
| Example 2 | 1 | 2 | 0.1 | PS | 0.5 | — | 2.16 | 87.3 | 95.4 | 24.5 | 83.1 | |
| Example 3 | 1 | 2 | 0.1 | PS | 0.5 | — | 5.4 | 99.4 | 101.4 | 21.1 | 90.3 | |
| Example 4 | 1 | 8 | 0.3 | PS | 2 | — | 11.3 | 88.2 | 91.4 | 19.2 | 86.1 | |
| Example 5 | 1 | 8 | 0.3 | PS | 2 | — | 4 | 81.7 | 87.9 | 22.8 | 84.1 | |
| Example 6 | 1 | 8 | 0.3 | PS | 2 | — | 16.95 | 84.6 | 83.9 | 18.8 | 85.3 | |
| Example 7 | 1 | 6 | 0.2 | PS | 0.5 | — | 8.7 | 91.4 | 102.7 | 20.2 | 90.4 | |
| Example 8 | 1 | 8 | 0.05 | PS | 0.5 | — | 14 | 89.3 | 102.6 | 23 | 86.8 | |
| Example 9 | 1 | 8 | 0.3 | PRS | 2 | — | 4 | 82.2 | 91.4 | 23.2 | 80.2 | |
| Example 10 | 1 | 8 | 0.3 | TMS | 2 | — | 4 | 79.1 | 81.9 | 29.5 | 80.7 | |
| Example 11 | 1 | 8 | 0.3 | PS TMS | 1 1 | — | 16.95 | 89.6 | 90.4 | 19 | 91.6 | |
| Example 12 | 1 | 6 | 0.2 | PS Esa | 0.5 1 | — | 8.7 | 92.1 | 98.2 | 24.4 | 92.2 | |
| Example 13 | 1 | 4 | 0.2 | ESa | 1.5 | — | 10.05 | 85.3 | 94.1 | 29.3 | 86.6 | |
| Example 14 | 1 | 8 | 0.3 | PS Esa | 1 1 | — | 18 | 88.1 | 93.2 | 18.9 | 92.4 | |
| Example 15 | 1 | 4 | 0.2 | PS Esa | 0.5 1 | — | 22 | 63.2 | 79.1 | 46.8 | 52.6 | Electrolyte solution viscosity increase |

TABLE 2

| | Additive (weight ratio) | | | | | Total amount of additive in non-aqueous solution (g) | After high-temperature storage | | | | |
|---|---|---|---|---|---|---|---|---|---|---|---|
| | | | | Compound containing sulfonate group or sulfate group | | | Capacity retention (%) | Output characteristics (%) | Thickness increase rate (%) | Cycle life characteristics (%) | |
| | LiDFP | FB | TVS | Type | Weight ratio | Others | | | | | Remarks |
| Comparative Example 1 | — | — | — | — | | VC | 3 | 54.1 | 80.2 | vent | 57.2 | |
| Comparative Example 2 | — | — | — | — | | LiBF₄ | 2 | 47.1 | 66.3 | 81.2 | 41.2 | |
| Comparative Example 3 | 1 | 15 | 0.2 | PS | 1.5 | | 12.7 | 72.8 | 29 | 27.1 | 67.2 | |
| Comparative Example 4 | 1 | 6 | 0.5 | PS | 1.5 | | 9 | 67.9 | 21.7 | 24.1 | 69.4 | |
| Comparative Example 5 | 1 | 6 | 0.2 | PS | 5 | | 10.2 | 75.3 | 56.3 | 17.3 | 71.2 | |
| Comparative Example 6 | — | 6 | 0.2 | PS | 2 | | 8.2 | (Cell inoperable) | | | | |
| Comparative Example 7 | 2 | — | 0.2 | PS | 3 | | 5.2 | 78.6 | 58.2 | 19.1 | 75.1 | Overcharge Fail |
| Comparative Example 8 | 1 | 6 | — | PS | 1.5 | | 8.5 | 96.2 | 73.6 | 21.7 | 75.4 | |
| Comparative Example 9 | 1 | 6 | 0.2 | — | — | | 7.2 | 55.6 | 36.3 | vent | 57.6 | |
| Comparative Example 10 | 1 | 6 | 0.2 | MMDS | 2 | | 9.2 | 71.5 | 85.6 | vent | 46.8 | |
| Comparative Example 11 | 0.9 | 8 | 0.3 | TMS | 2 | | 2.15 | 52.8 | 63.1 | vent | 43.1 | |
| Comparative Example 12 | 1 | 6 | 0.04 | Esa | 2 | | 9.04 | 66.3 | 58.9 | vent | 53.3 | |
| Comparative Example 13 | 1 | 6 | 0.2 | PS | 0.4 | | 3.5 | 62.6 | 75.7 | 38.4 | 66.9 | |

In Tables 1 and 2, PS denotes 1,3-propane sultone, PRS denotes 1,3-propene sultone, TMS denotes trimethylene sulfate, and ESa denotes ethylene sulfate. Also, MMDS denotes methylene methanedisulfonate.

Referring to Tables 1 and 2, the lithium secondary batteries of Examples 1 to 14, which included the non-aqueous electrolyte solutions containing the mixed additives, had a capacity retention after high-temperature storage of 79.1% or more, output characteristics of 81.9%, a battery thickness increase rate of 29.5% or less, and cycle life characteristics of 80.2% or more, wherein, it may be understood that the capacity retention after high-temperature storage, the output characteristics, the battery thickness increase rate, and the cycle life characteristics were all significantly improved in comparison to those of the lithium secondary batteries of Comparative Examples 1 and 2 which included the non-aqueous electrolyte solutions without a mixed additive.

With respect to the lithium secondary battery of Example 15 in which the excessive amount of the mixed additive was included, capacity retention was improved in comparison to that of Comparative Example 2, but it may be understood that output characteristics and cycle life characteristics were reduced in comparison to those of the lithium secondary batteries of Examples 1 to 14 while wettability of the electrolyte solution was reduced due to an increase in viscosity of the non-aqueous electrolyte solution.

With respect to the lithium secondary batteries of Comparative Examples 3 to 5 including the non-aqueous electrolyte solutions in which at least one component among the mixed additive components was excessively included, it may be understood that the capacity retention, output characteristics, and cycle life characteristics, excluding the battery thickness increase rate after high-temperature storage, were all degraded in comparison to those of the lithium secondary batteries of Examples 1 to 14 including the non-aqueous electrolyte solutions of the present invention.

When comparing the lithium secondary batteries of Example 7 and Comparative Example 6 in which there was a difference in whether or not lithium difluorophosphate among the additive components was added, the cell was inoperable with respect to the lithium secondary battery of Comparative Example 6, but it may be understood that, with respect to the lithium secondary battery of Example 7, significantly better capacity retention after high-temperature storage, output characteristics, battery thickness increase rate, and high-temperature cycle life characteristics were achieved.

Also, when comparing the lithium secondary batteries of Example 7 and Comparative Example 7 in which there was a difference in whether or not fluorobenzene among the additive components was added, the lithium secondary battery of Comparative Example 7 was ignited during overcharge, but it may be understood that the lithium secondary battery of Example 7 was not ignited during overcharge while the capacity retention after high-temperature storage, output characteristics, battery thickness increase rate, and high-temperature cycle life characteristics were maintained.

Furthermore, when comparing the lithium secondary batteries of Example 7 and Comparative Example 8 in which there was a difference in whether or not tetravinylsilane among the additive components was added, it may be understood that, with respect to the lithium secondary battery of Example 7, significantly better capacity retention, output characteristics, and cycle life characteristics, excluding battery thickness increase rate after high-temperature storage, were achieved according to the addition of the tetravinylsilane in comparison to those of the lithium secondary battery of Comparative Example 8.

Also, when comparing the lithium secondary batteries of Example 7 and Comparative Example 9 in which there was a difference in whether or not the compound containing one sulfonate group or sulfate group, among the additive components, was added, it may be understood that the lithium secondary battery of Example 7 exhibited significantly better capacity after high-temperature storage, output characteristics, and cycle life characteristics than the lithium secondary battery of Comparative Example 9 and had an excellent effect of suppressing an increase in battery thickness.

With respect to the secondary battery of Comparative Example 10 including the non-aqueous electrolyte solution which contained methylene methanedisulfonate including two sulfonate groups, output characteristics were the same level as those of the lithium secondary batteries of Examples 1 to 14 including the non-aqueous electrolyte solutions of the present invention, but it may be understood that capacity retention, output characteristics, and cycle life characteristics were all degraded in comparison to those of the lithium secondary batteries of Examples 1 to 14 including the non-aqueous electrolyte solutions of the present invention.

With respect to the lithium secondary batteries of Comparative Examples 11 to 13 including the non-aqueous electrolyte solutions in which at least one component among the mixed additive components was included in a small amount, it may be understood that capacity retention, output characteristics, and cycle life characteristics were all degraded in comparison to those of the lithium secondary batteries of Examples 1 to 14 including the non-aqueous electrolyte solutions of the present invention.

Experimental Example 6. Overcharge Stability Evaluation Test

Figure 2:
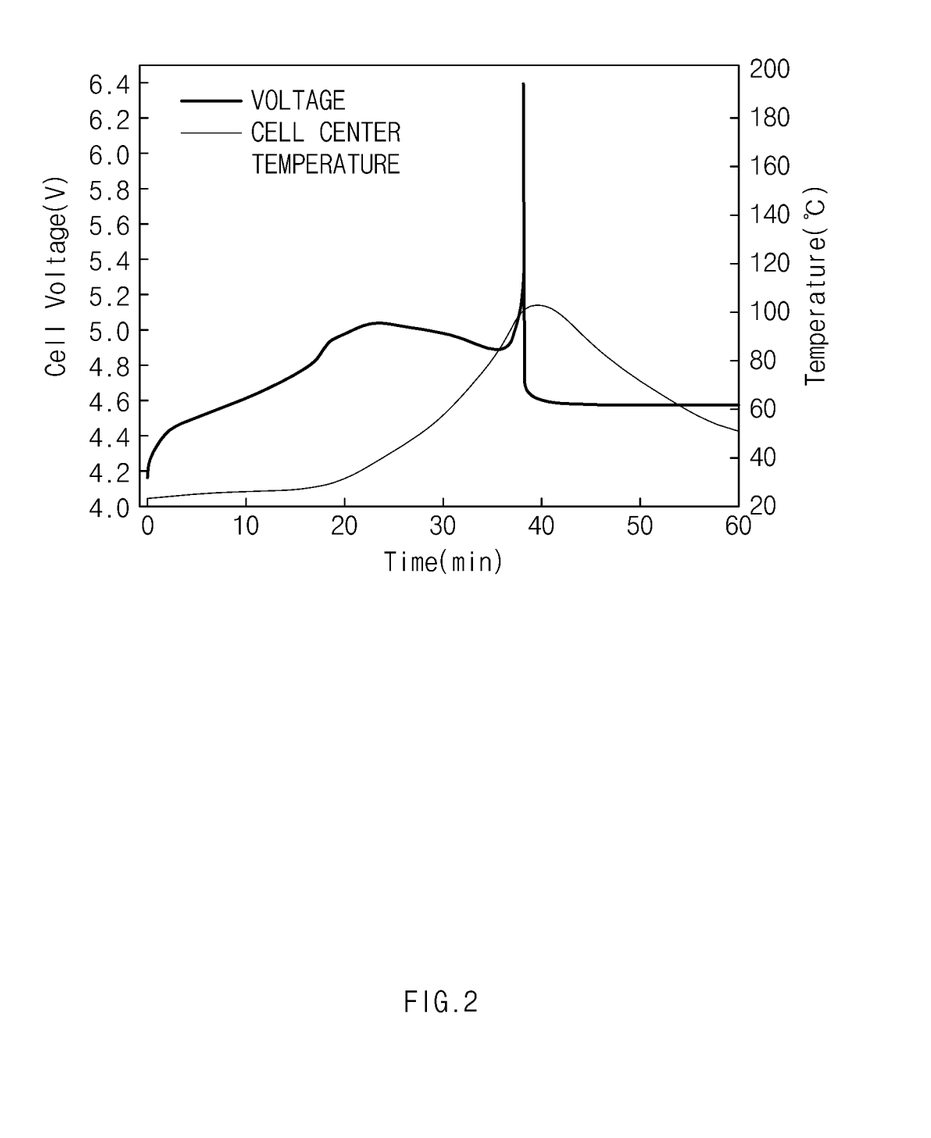
FIG. 2 is a graph illustrating the results of overcharge stability evaluation of a lithium secondary battery of Example 1 according to Experimental Example 6 of the present invention.
Figure 3:
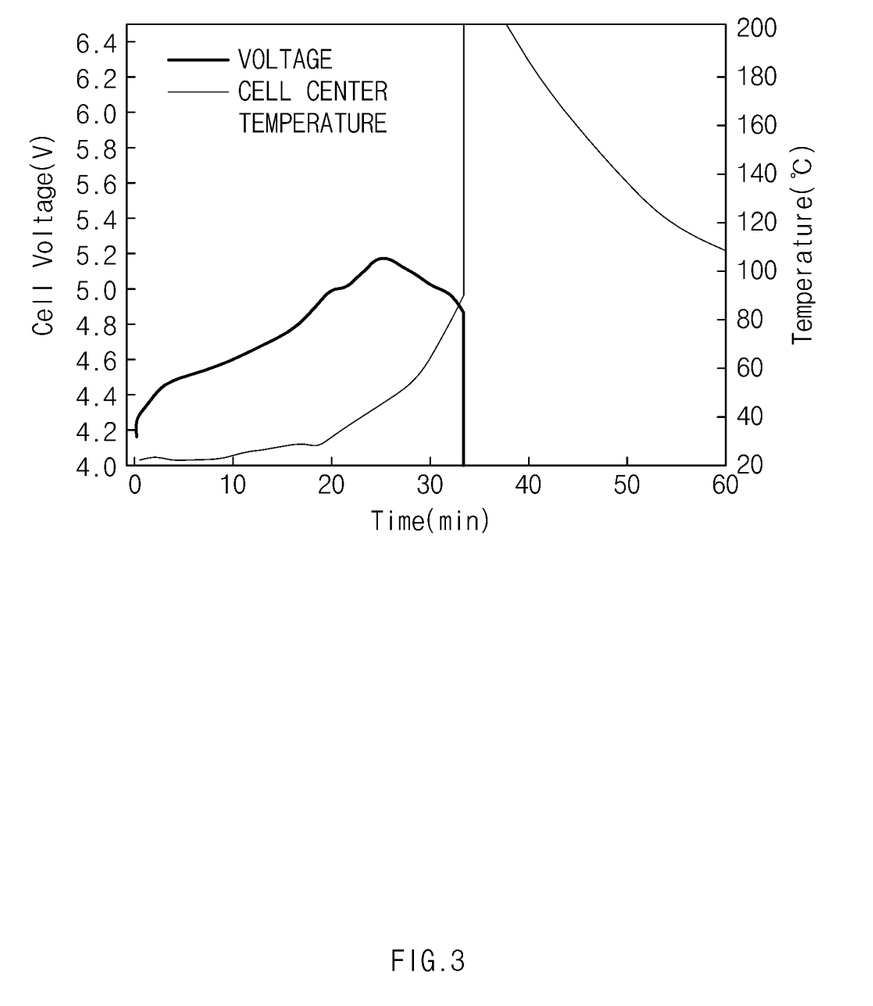
FIG. 3 is a graph illustrating the results of overcharge stability evaluation of a lithium secondary battery of Comparative Example 7 according to Experimental Example 6 of the present invention.

Each of the lithium secondary batteries prepared in Example 1 and Comparative Example 7 was charged at 0.33 C/4.25 V to a SOC of 100% under a constant current/constant voltage (CC/CV) condition at 25° C. using the PNE-0506 charge/discharge equipment (manufacturer: PNE SOLUTION Co., Ltd., 5 V, 6 A). Thereafter, changes in temperature and voltage of each battery were measured while each battery was overcharged at a constant current of 0.33 C to 6.4 V to confirm whether or not the battery was ignited. The results for the lithium secondary battery of Example 1 are illustrated in FIG. 2, and the results for the lithium secondary battery of Comparative Example 7 are illustrated in FIG. 3.

When the change in voltage with overcharge time is examined, with respect to the lithium secondary battery of Example 1 (see FIG. 2), it may be understood that the voltage was low at 5.0 V or less between 7 minutes to 22 minutes. In contrast, with respect to the lithium secondary battery of Comparative Example 7 (see FIG. 3) including the non-aqueous electrolyte solution without fluorobenzene, it may be understood that the voltage was increased up to 5.2 V at about 25 minutes.

That is, with respect to the lithium secondary battery of the present invention, it may be understood that the additional reaction between the battery and the electrolyte suppressed due to reacted and decomposed the fluorobenzene at the corresponding voltage level, thereby preventing overcharge of the battery.

In this case, it may be confirmed that, since the fluorobenzene significantly prevented the depletion of the electrolyte solution and a lithium precipitation phenomenon due to an increase in the temperature of the battery and additional overcharge, ignition was suppressed.

Also, when the change in temperature with the overcharge time is examined, with respect to the lithium secondary battery of Example 1 (see FIG. 2) which included the non-aqueous electrolyte solution containing fluorobenzene as an essential additive component, the temperature was rapidly increased to 100° C. for 40 minutes, but the temperature was gradually decreased as a CID was short-circuited after 40 minutes and thus, it may be understood that the temperature did not reach an ignition temperature. In contrast, with respect to the lithium secondary battery of Comparative Example 7 (see FIG. 3) including the non-aqueous electrolyte solution that did not contain fluorobenzene as an additive, the temperature was rapidly increased until about 33 minutes and was increased to a maximum of 200° C. or more after 33 minutes, and thus, it may be confirmed that the battery was eventually ignited.

According to these results, it may be understood that the stability during overcharge of the lithium secondary battery of Example 1 was improved.

The invention claimed is:

1. A non-aqueous electrolyte solution for a lithium secondary battery, comprising:
   a lithium salt;
   an organic solvent; and
   a mixed additive,
   wherein the mixed additive includes lithium difluorophosphate, fluorobenzene, tetravinylsilane, and a compound containing one sulfonate group or sulfate group in a weight ratio of 1:2:0.05:0.5 to 1:8:0.3:2.

2. The non-aqueous electrolyte solution for a lithium secondary battery of claim 1, wherein the weight ratio is in a range of 1:2:0.05:0.5 to 1:6:0.3:1.5.

3. The non-aqueous electrolyte solution for a lithium secondary battery of claim 1, wherein the compound containing one sulfonate group or sulfate group comprises at least one selected from the group consisting of ethylene sulfate, trimethylene sulfate, methyl trimethylene sulfate, 1,3-propane sultone, 1,4-butane sultone, ethene sultone, 1,4-butene sultone, 1-methyl-1,3-propene sultone, and 1,3-propene sultone.

4. The non-aqueous electrolyte solution for a lithium secondary battery of claim 1, wherein the compound containing one sulfonate group or sulfate group comprises at least one selected from the group consisting of ethylene sulfate, trimethylene sulfate, 1,3-propane sultone, and 1,3-propene sultone.

5. The non-aqueous electrolyte solution for a lithium secondary battery of claim 1, wherein the mixed additive is included in an amount of 1 wt % to 18 wt % based on a total weight of the non-aqueous electrolyte solution for a lithium secondary battery.

6. The non-aqueous electrolyte solution for a lithium secondary battery of claim 1, further comprising at least one first additive for forming a solid electrolyte interface (SEI) which is selected from the group consisting of a halogen-substituted carbonate-based compound, a nitrile-based compound, a cyclic carbonate-based compound, a phosphate-based compound, a borate-based compound, and a lithium salt-based compound.

7. The non-aqueous electrolyte solution for a lithium secondary battery of claim 1, further comprising at least one second additive for forming an SEI which is selected from the group consisting of diphenyl disulfide, di-p-tolyl disulfide, and bis(4-methoxyphenyl) disulfide (BMPDS).

8. A lithium secondary battery comprising:
a negative electrode;
a positive electrode;
a separator disposed between the negative electrode and the positive electrode; and
the non-aqueous electrolyte solution of claim 1.

9. The lithium secondary battery of claim 8, wherein the positive electrode includes a positive electrode active material, wherein the positive electrode active material comprises a lithium-nickel-manganese-cobalt-based oxide.

10. The lithium secondary battery of claim 9, wherein the lithium-nickel-manganese cobalt-based oxide comprises at least one selected from the group consisting of $Li(Ni_{1/3}Mn_{1/3}Co_{1/3})O_2$, $Li(Ni_{0.35}Mn_{0.28}Co_{0.37})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

\* \* \* \* \*